S. SMITH.
AUTOMATIC CLUTCH.
APPLICATION FILED JUNE 10, 1914.
1,147,126.
Patented July 20, 1915.
2 SHEETS—SHEET 2.
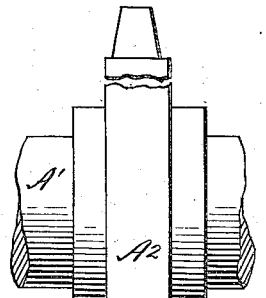
Fig. 6.
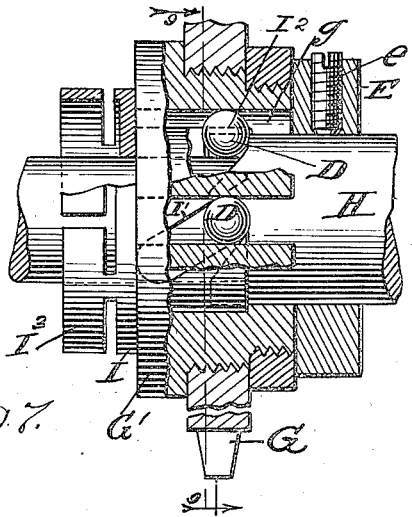
Fig. 7.
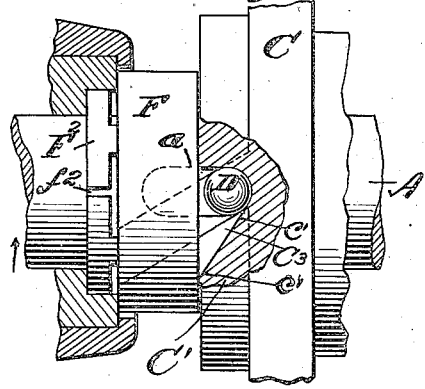
Fig. 8.
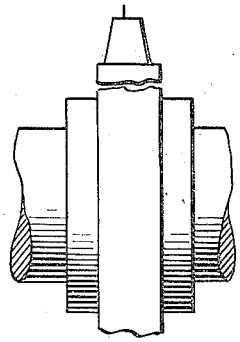
Fig. 10.
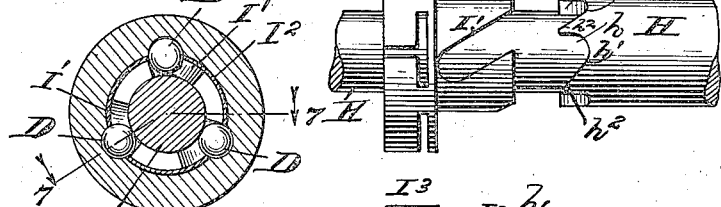
Fig. 9. Fig. 11.
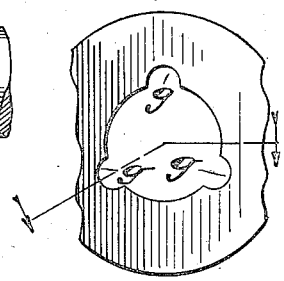
Witnesses
E. R. Barrett
S. M. Ebert
Inventor
Sidney Smith
By J. S. Thomas
Attorney

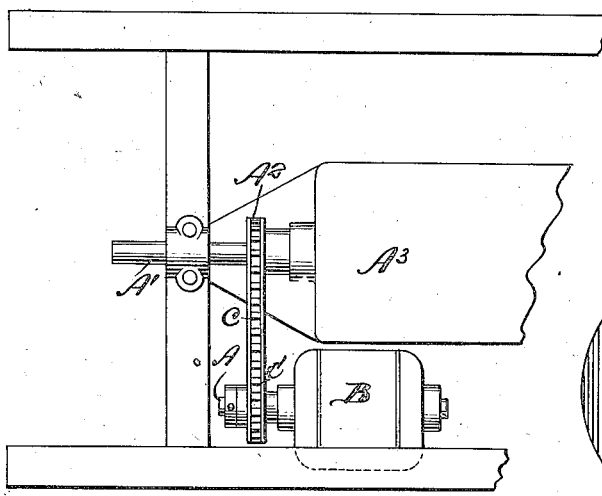

UNITED STATES PATENT OFFICE.

SIDNEY SMITH, OF DETROIT, MICHIGAN.

AUTOMATIC CLUTCH.

1,147,126.  Specification of Letters Patent.  Patented July 20, 1915.

Application filed June 10, 1914. Serial No. 844,117.

*To all whom it may concern:*

Be it known that I, SIDNEY SMITH, subject of Great Britain, residing at Detroit, county of Wayne, State of Michigan, have invented a certain new and useful Improvement in Automatic Clutches, and declare the following to be a full, clear, and exact description of the same, such as will enable others skilled in the art to which it pertains to make and use the same, reference being had to the accompanying drawings, which form a part of this specification.

My invention relates to an automatic positive drive ball clutch, adapted for use wherever it is desired to positively drive a free wheel or a free shaft in one direction and to automatically free the wheel or shaft from the driving member upon the stoppage or the reverse motion of the driving member, the construction being such that the driven wheel or shaft is free to turn in either direction until again engaged by the clutch mechanism actuated by a forward movement of the driving member.

One of the objects of this invention is to provide a positive mechanical means for shifting the balls of the clutch mechanism into either a locked or into a released position as may be required;—the construction providing for the automatic escapement of the balls from their driving relation when permitting the driven member to run free either forward or backward as may be desired.

While my invention is well adapted for any or all of the uses to which a clutch of this character may be employed, it is especially advantageous for coaster brakes for bicycles, lawn mowers, self starters for internal combustion engines,—it being essential in the latter case that upon the engine operating under its own power at a speed greater than the "starter", that the clutch mechanism should be instantly and automatically released from connection with the motor by which the engine was initially "turned over."

Other advantages and improvements will hereafter appear.

In the drawings accompanying this specification—Figure 1 is a longitudinal sectional view through the clutch member indicating a fragmentary portion of the driving shaft and a portion of the frame of the machine in which it is journaled:—the drive wheel being free to turn in either direction. Fig. 2 is a detail perspective view of the part hereafter referred to as the spool cam. Fig. 3 is a cross-sectional view through the drive shaft, and the spool cam on line 3—3 of Fig. 1 showing the balls lodged in their respective cam grooves in the hub of the sprocket wheel. Fig. 4 is an elevation of the cam hub of the sprocket wheel. Fig. 5 is a fragmentary plan view of an automobile chassis and its prime mover, indicating a self starter carrying a sprocket wheel connected by a driving chain with the sprocket wheel on the shaft of the prime mover. Fig. 6 is an enlarged fragmentary detail indicating a driven sprocket wheel keyed to the shaft of the prime mover and directly below it the driving sprocket,—with parts broken away to show the clutch mechanism, mounted on the shaft of the self starter. Fig. 7 is a fragmentary detail of a modification, in which the driving sprocket is keyed to the driving shaft, connected by a chain (not shown) with the sprocket wheel above, the driven sprocket being partially broken away and in section taken on line 7—7 of Fig. 9. Fig. 8 is a fragmentary elevation of the shaft shown in Fig. 7 with the spool cam mounted upon the shaft, the spool cam being separated from the cam integral with the shaft in order to more clearly disclose the construction of the respective parts. Fig. 9 is a cross sectional view on line 9—9 of Fig. 7 looking toward the hub of the sprocket. Fig. 10 is an elevation of the hub of the driven sprocket wheel. Fig. 11 is a longitudinal sectional view through the shaft and cam spool in assembled relation.

Referring now to the letters of reference placed upon the drawings:—A, denotes a driving shaft, and as indicated in Fig. 5 of the drawings it may be the armature shaft of an electric self starter B.

A' is a driven shaft and A² is a sprocket wheel keyed to the shaft A'.

A³ denotes an internal combustion engine.

C, indicates a sprocket wheel having a screw-threaded engagement with its hub C', in turn loosely mounted upon the drive shaft A.

c, denotes a sprocket chain connection between the wheel C and the wheel A².

C² is a nut engaging the hub C' to lock the sprocket wheel upon the hub.

C³ denotes inclined grooves formed in the hub to receive the respective balls D, and a indicates coacting longitudinal grooves in the shaft A, in which the balls are partially lodged.

E, is a collar secured to the shaft by a set screw $e$.

F, denotes a spool cam loosely sleeved upon the shaft having on one side an annular flange F', projecting into the hub of the sprocket wheel. The flange F' is provided with a plurality of slots indicated at $f$, forming inclined cam ways for the balls leading into the grooves $f'$ in the body of the spool cam F.

$F^2$ is an annular spring flange projecting from the opposite side of the cam spool into the journal bearing for the shaft A, or other suitable stationary member:—the flange being divided as indicated at $f^2$ to provide a yielding edge and thus increase its resiliency.

The spring flange of the spool cam provides a slight frictional resistance to its rotation with the drive shaft in order that the balls which are partially lodged within the longitudinal grooves of the drive shaft may be forced by the inclined grooves of the spool cam along the longitudinal grooves of the shaft to either a locked or unlocked position as will be hereafter explained.

Having indicated the several parts of the device (shown in Figs. 1 to 6) by reference letters its operation will now be more fully explained.

In Fig. 1 the sprocket wheel C is free to turn in either direction upon the driving shaft A,—while Fig. 6 shows the balls of the clutch in position to lock the sprocket wheel to the shaft, whereby the wheel rotates with the shaft and by means of a sprocket chain $c$ may drive a sprocket wheel $A^2$ on the driven shaft A'. The sprocket wheel C shown in Fig. 1 is free to turn in either direction when the driving pressure is off the driving shaft and synchronous with the rotation of the driving shaft, the balls, which are partially lodged within the longitudinal grooves $a$ of the shaft, are forced along the longitudinal grooves of the shaft by the inclined guide walls of the spool cam F, in turn yieldably held against rotation with the drive shaft by its spring flange $F^2$, engaging the journal bearing of the shaft, or other part adapted to momentarily retard its rotation. The spool cam F is momentarily held against rotation with the drive shaft A, through the resilient action of its spring flange $F^2$, which yieldingly engages the stationary journal bearing of the driving shaft. It will therefore be obvious that the balls will through contact with the inclined walls of the momentarily held spool cam, be forced thereby along the grooves $a$ in the shaft when the latter is rotating to the right, or in the direction of the arrow, until they reach the limit of their travel, as indicated in Fig. 6, in which position the sprocket wheel is locked to the drive shaft by the coaction of the balls D. Upon the balls reaching their limit of travel as indicated in Fig. 6, the sprocket wheel and spool cam will rotate as a unit with the driving shaft, so long as the shaft is actuated, but immediately upon the driving power ceasing to operate the shaft, or upon the speed of the driven sprocket wheel exceeding that of the driving shaft,—as in a starter for internal combustion engines—the sprocket wheel moving forward under its acquired momentum will cause the balls to contact with the inclined faces $c'$ to $c'$ of the grooves $C^3$ in the hub of the sprocket wheel C, which serves to push the balls out along the longitudinal grooves $a$ of the driving shaft, causing the spool cam F at the same time to rotate sufficiently to permit the balls to travel the full length of the longitudinal grooves back to their initial position as indicated in Fig. 1,—wherein the sprocket wheel is free to turn in either direction upon the shaft.

In the modification indicated by Figs. 7 to 11 the sprocket wheel G, (or other driving gear) is designed to drive the shaft H, the shaft being free to turn in either direction within the driving sprocket wheel, when the latter is not rotating.

In the modification the shaft H is larger in diameter, a portion of its length, the end of the enlarged portion being cut away to provide inclined grooves $h$, corresponding with the inclined grooves $C^3$ of the hub C' previously described. The spool cam I, is provided on one side with a plurality of inclined guides I', adapted to register with the grooves $h$, the flange portion $I^2$, of guides I' overlapping the end of the enlarged portion of the shaft H—see Fig. 11. The opposite side of the spool cam carries an annular spring flange $I^3$, adapted to engage the journal bearing or other stationary part to momentarily check its rotation, the construction and operation being similar to the spool cam previously described. The hub G' of the sprocket wheel G is provided with a plurality of longitudinal grooves $g$ in which the balls D are partially lodged. It will now be apparent that upon power being applied to the sprocket wheel G, that the balls D partially lodged within the longitudinal grooves $g$ in the hub G will be forced by the inclined guides I' of the spool cam I, to the position indicated in Fig. 7 of the drawing in which the driving sprocket is shown locked to the shaft. Coincident with the suspension of the driving operation of the sprocket wheel G, the inclined face $h'$—$h^2$ of the groove $h$ formed in the shaft H, will force the balls back to the opposite end of the longitudinal grooves $g$ in the hub G; thereby releasing the shaft from its locked relation with the driving sprocket wheel G—the shaft being now free to rotate in either direction within the hub of the sprocket wheel in a manner similar to that previously described with reference to the sprocket wheel when released from the driving shaft.

It will be obvious that the construction and operation of the modification shown is similar to that of the device previously described, provisions being made in the modification, however, for a free shaft (forward or back) adapted to be driven by the driving sprocket as a single unit therewith upon the application of power to the driving sprocket, in lieu of the previously described free sprocket wheel (forward and back) mounted upon the driving shaft.

Having thus described my invention, what I claim is:—

1. In a device of the character described, a driving member provided with a plurality of grooves disposed longitudinally to the axis of the driving member, a ball lodged in each of the several grooves, a driven member journaled concentric to the driving member provided with a plurality of grooves adapted to receive the respective balls, the wall on one side of each groove being at an angle to the opposing wall of the groove, whereby it may serve as a cam to force the balls out of the grooves of the driven member upon the coöperating driving member ceasing to operate as a driving member, and means coöperating with both the driving and driven members to force the balls along the longitudinal grooves of the driving member into the grooves of the driven member that the driving and driven members may rotate as a single unit.

2. In a device of the character described, a driving member provided with a plurality of grooves disposed longitudinally to the axis of the driving member, a ball partially lodged in each of the several grooves, a driven member journaled concentric to the driving member provided with a plurality of grooves adapted to receive the respective balls, the wall on one side of each groove being on an angle to its opposing wall, whereby said angular walls may serve in conjunction with the inclined grooves of a spool concentric with the driving member as cams to force the respective balls out of the grooves in the driven member that the latter may be free to turn in either direction upon the driving member ceasing to operate, a spool concentric with the axis of the driving member having angularly arranged slots and grooves adapted to force the respective balls along the longitudinal grooves of the driving member into or out of the grooves of the driven member, whereby the driving and driven members may be locked together as a unit or released from driving engagement, and means carried by the spool to retard its rotation, whereby the balls may be forced to the limit of their travel in either direction along the longitudinal grooves of the driving member through the co-action of the angularly arranged slots and grooves of the spool.

3. In a device of the character described, a driving shaft provided with a plurality of longitudinally disposed grooves, a ball partially lodged in each of the several grooves, a gear mounted upon said shaft having a hub provided with a plurality of grooves adapted to receive the respective balls, the wall on one side of each of the latter grooves being at an angle to its opposing wall, whereby said angular walls may serve in conjunction with the inclined grooves of a spool concentric with the driving shaft as cams to force the respective balls out of the grooves in the gear upon the shaft ceasing to operate, a spool concentric with the axis of the driving shaft having angularly arranged slots and grooves adapted to force the respective balls along the longitudinal grooves of the driving shaft into or out of the grooves of the gear hub, whereby the driving shaft and gear may be locked together as a unit or released from driving engagement, and means carried by the spool to retard its rotation, whereby the balls may be forced to the limit of their travel in either direction along the longitudinal grooves of the driving shaft through the coöperation of the angularly arranged slots and grooves of the spool.

In testimony whereof, I sign this specification in the presence of two witnesses.

SIDNEY SMITH.

Witnesses:
S. M. EBERT,
S. E. THOMAS.